US008852947B2

(12) United States Patent
Cleary et al.

(10) Patent No.: US 8,852,947 B2
(45) Date of Patent: Oct. 7, 2014

(54) APPLICATION OF UNIQUE SURFACE COATINGS TO HIGH VOLUME MANUFACTURING OUTPUT

(75) Inventors: Michael Cleary, Liverpool (GB); Marcello Vitale, Liverpool (GB); Sharon Robinson, Liverpool (GB)

(73) Assignee: Smartwater Research Limited, Flintshire (GB)

( * ) Notice: Subject to any disclaimer, the term of this patent is extended or adjusted under 35 U.S.C. 154(b) by 431 days.

(21) Appl. No.: 13/146,850

(22) PCT Filed: Feb. 2, 2010

(86) PCT No.: PCT/GB2010/050160
§ 371 (c)(1),
(2), (4) Date: Nov. 30, 2011

(87) PCT Pub. No.: WO2010/089588
PCT Pub. Date: Aug. 12, 2010

(65) Prior Publication Data
US 2012/0068449 A1    Mar. 22, 2012

(30) Foreign Application Priority Data
Feb. 6, 2009    (GB) .................................. 0902057.9

(51) Int. Cl.
| G01N 37/00 | (2006.01) |
| G09C 3/00 | (2006.01) |
| G03C 11/00 | (2006.01) |
| G06K 19/06 | (2006.01) |
| G03C 5/00 | (2006.01) |
| G03C 3/00 | (2006.01) |
| B41M 3/14 | (2006.01) |
| B44F 1/12 | (2006.01) |

(52) U.S. Cl.
CPC .......... G06K 19/06009 (2013.01); G03C 11/00 (2013.01)
USPC .......... 436/56; 283/74; 427/7; 430/8; 430/10; 430/11

(58) Field of Classification Search
USPC ............ 436/56; 283/74; 430/8, 10, 11; 427/7
See application file for complete search history.

(56) References Cited

U.S. PATENT DOCUMENTS

| 4,243,734 A | 1/1981 | Dillon |
| 7,094,305 B2 * | 8/2006 | Cleary .......................... 156/248 |
| 2005/0145721 A1 | 7/2005 | McLaws et al. |

FOREIGN PATENT DOCUMENTS

| CN | 1481282 A | 3/2004 |
| EP | 1216758 A1 | 6/2002 |
| GB | 2410208 A | 7/2005 |
| WO | 02/40355 | 5/2002 |
| WO | 2007/051226 | 5/2007 |
| WO | 2007/065197 | 6/2007 |

OTHER PUBLICATIONS

Svecova et al., "Comparison Between Batch and Column Experiments to Determine the Surface Charge Properties of Rutile TiO2 Power," Journal of Colloid and Interface Science, 325, 2, 2008, 363-370.

* cited by examiner

Primary Examiner — Jill Warden
Assistant Examiner — Julie Tavares
(74) Attorney, Agent, or Firm — Burns & Levinson, LLP; Joseph M. Maraia

(57) ABSTRACT

A photographic material for image display including an intimately sorbed contrast agent that provides a contrast layer against which the recorded image can be seen regardless of the nature and color of the background.

2 Claims, No Drawings

APPLICATION OF UNIQUE SURFACE COATINGS TO HIGH VOLUME MANUFACTURING OUTPUT

RELATED APPLICATIONS

This application is a 371 National Stage application of International Application No. PCT/GB2010/050160, filed on Feb. 2, 2010, which claims priority to GB 0902057.9, filed Feb. 6, 2009, the entire contents of which are herein incorporated by reference.

The present invention describes a novel approach to the application of unique coatings to a surface. It provides a method of identifying items quickly and in large numbers. Every uniform, mass produced item on a production line is rendered unique. It produces a final product that is more effective than those currently in use.

In many situations it is now necessary to apply identification marks to goods to facilitate product tracking and for security purposes. Whilst this has been the case for some time, such marks now have to be resistant to removal. A method of providing such resistance is to apply marks in such number that the removal of all of them is firstly daunting if not impossible and secondly the very act of so doing imparts suspicion by their absence.

Previous attempts have been made to provide such a method as shown in WO0240355, EP1216758, US2005145721, CN1481282, WO2007051226, WO2007065197, and others. However, these suffer from a problem of poor legibility, being based upon either photographic or laser images. The former approach uses photographic film as its base. It provides black markings on a transparent background, which therefore cannot be seen against anything but a white background.

The latter approach using lasers does not provide the same level of precision as the photographic approach. The small digits required cannot yet be produced with the same clarity or readability as a photographic image.

Given that the photographic method provides the clearer image, work has been done to improve the use of this approach by providing a backing layer to give the required contrast. Further to this, laser cutting around the photographic digits with a laser was the basis of our patent GB2410208B.

The present invention provides a further improvement over this method in that it is a simpler and quicker approach, producing a small particle with narrow cross section that is durable in a range of polar and apolar solvents, among which IPA and acetone.

The present invention describes a novel photographic material for image display including an intimately sorbed contrast agent providing a contrast layer against which the recorded image can be seen regardless of the nature and colour of the background. It also describes a method for producing said material. It further describes the application of said materials to the marking and identification of goods for security and anti-counterfeiting.

BACKGROUND

Photographic image display materials exist in two forms
in the first case, the image is visible against a background layer attached to the photographic material, by coating or lamination, before image formation, development and fixing, as in conventional photographic paper, but sometime added after the image is developed in the second case the material does not comprise such a background and the image is visible either using transmitted light through the variably transparent layers, or using reflected light off an external background. To this category belong most photographic materials, including negatives, slides, transparencies, movie capture film, movie projection film, microfilm and all kinds of intermediates.

The first patent claiming the use of miniaturized photographic images for security purposes appears to be U.S. Pat. No. 4,243,734, and the method has been extensively applied commercially since. However, some applications are impossible, or require extremely laborious processes, with either of the described types of photographic materials. For example, images on a film cannot be viewed unless they are placed on a sufficiently light-coloured background to provide contrast to the dark areas, or using a back-lit transmission viewing device, since the light areas correspond to light being transmitted unchanged. Several applications of microfilm "microdots", containing marking codes for security purposes, suffer from severe limitations due to this constraint.

The use of microscopic text or codes, not readable by the naked eye, for security purposes is certainly old, but it also is certainly not becoming obsolete. Microscopic text is part of the security features of banknotes, secure documents, passports, credit cards and other IDs. Printing methods that do not directly rely on photographic imaging can only achieve, until now, image sizes as small as 400 microns (from the specifications of the security printer Zebra P640i). Compare that with an image size achievable on a microfilm of less than 30 microns. Clearly, the use of microfilm as the medium for micro-text marking would be very advantageous, if the limitations mentioned above could be overcome.

Lamination of a white or light-coloured background to a microfilm has been proposed as a way to overcome the limitations of clear microfilm (GB2410208B). However, the photographic material is subjected to thermal and mechanical stresses by the lamination process. The resulting structure has a point of weakness where the laminate is attached to the photographic material, and is not suitable for all liquid environments.

SUMMARY OF THE INVENTION

According to the present invention there is provided a method of producing batches of micro particles, comprising the steps of creating a photographic material having a plurality of codes imaged thereon;

forming a contrast layer of uniform colour onto the material; and cutting the material to define a plurality of micro particles, each micro particle containing said code.

Preferably, the step of forming a contrast layer of uniform colour onto the material, further comprises the steps of:

exposing the photographic material to an aqueous dispersion containing the contrast layer for a period of time to allow sorption; and rinsing the photographic material to wash away any unsorbed excess.

Further preferably, the contrast layer is a white pigment of small enough dimension to penetrate, even partially, the surface layer of the photographic material.

Also according to the present invention there is provided a micro particle comprising:

a photographic material carrying the image of a primary identifier; and a contrast layer, whereby the contrast layer is sorbed by the material and contrasts with the primary identifier.

Preferably, the contrast layer is formed from an aqueous dispersion containing any one of the following: $TiO_2$, $SiO_2$, $ZnO$, $MgCO_3$, $BaCO_3$, $BaSO_4$, $SnO_2$ or combinations thereof.

Further preferably, the contrast layer provides increased visibility via the addition of UV active luminescent agents or optical brighteners.

In use, the micro particle also contains a secondary identifier such as its shape, colour, luminescence colour and/or other effects provided on the micro particle directly or as part of the micro particle or in conjunction with the primary identifier.

Preferably, the primary identifier is an alphanumeric code.

Further according to the present invention there is provided a method of verifying the authenticity of an item, comprising the steps of:

applying a plurality of micro particles to an item, the micro particles carrying the image of a unique security marking and having a contrast layer thereon;

viewing the item containing the micro particle and comparing the code obtained with the corresponding unique security marking to verify its authenticity or otherwise.

DETAILED DESCRIPTION OF THE INVENTION

The present invention seeks to provide a third possible type of photographic image display material, namely the addition of a contrast agent to photographic materials, including negatives, slides, transparencies, movie capture film, movie projection film, microfilm and all kinds of intermediates, after image formation, development and fixing leading to the change in colour of one of the layers of the transparent photographic material and to the formation of a contrast layer of uniform colour, against which the image can be seen by reflection.

This layer is incorporated into the structure of the film so is fully flexible and resistant to cracking. The contrast layer is sorbed by the film. Such sorption can be by way of adsorption or absorption.

Preferably, the contrast agent can be a white pigment of small enough dimension to penetrate, even partially, the surface layer of the photographic material and to chemically or physically bind to the gelatine forming it, via the carboxyl or amine groups of the component amino-acids. Examples of such pigments are $TiO_2$, $SiO_2$, $ZnO$ and $SnO_2$, most preferably $TiO_2$ due to its high refractive index and already common usage as an opacifier in products such as paints and printing inks, but there are many other similar compounds. Pigments of any visible or luminescent colour can be used, providing optimal contrast to images of different colours.

Such pigments can be simply dispersed in water, in which they are insoluble, and the photographic material exposed to such dispersion for a minimal period of time, typically 2-60 seconds. Sorption is almost instantaneous and swelling of gelatin via water exposure is minimal. The photographic material can then be rinsed in water to wash away unsorbed excess. Sorption occurs only to the gelatin side of the photographic film, producing a distinctive contrast layer behind any image. When dry, the resulting coating may be exposed to various solvents including but not exclusively water, isopropyl alcohol, and acetone without loss of the sorbed pigment.

An alternative procedure employs white pigments that are soluble in water, and similarly brings the component ions inside the top gel layer by brief exposure of the photographic material to a solution of the soluble white pigments in water. Subsequent air drying causes the pigment to precipitate inside or over the top gel layer, producing the desired contrast layer. Examples of this type of materials are $MgCO_3$, $BaCO_3$ and $BaSO_4$, but there are many other suitable materials.

The contrast layer so formed allows viewing of the image through the transparent plastic (Ester, acetate or APEN) material.

The process described above can be carried out directly as an added step of the regular multi-step development process, and is compatible with other post-development processes. Such processes include after-hardening, to provide more physical robustness to the photographic material, achieved, for example, by exposure to aldehydes or any other hardening agent (see T. H. James, The theory of the photographic process, Eastman Kodak 1977). They also include addition of other agents, such as UV-active luminescent agents or optical brighteners, which provide greater visibility to the particles.

The differences between this novel material and the corresponding materials of the first type are several. One is the greater sharpness of the image, a basic difference between the transmission and reflection materials, due to defocusing of the imaging beams when they reflect off the surface of the background. A second advantage is smaller thickness and weight than for similar materials with laminated layers. A third is the ease of manufacturing vs. the laborious lamination process which is the best alternative. Furthermore, laminated layers have been show to be unstable when exposed to certain solvents, i.e. acetone.

When used in the security field, the present invention provides a method for producing coded micro-particles that, although smaller than alternatives, still offer greater legibility. The particle is also formed precisely around one complete alphanumeric identifier, therefore, although the particle may be smaller, the digits themselves can be larger, again improving legibility.

Again if used as a security aid, the presence of the marker may be easily seen if there is a fluorescent colour present in the photographic material. Further to this, although in some cases the marked area may already be visible through luminescence, the particles themselves could emit a different colour, again assisting in determining their initial position.

Once prepared with an image and the contrast layer, the particles can be cut from the original photographic film reel to be used individually and in batches. Such cut can be carried out, for example, following the method laid out in G32410208B. Particles of any shape can be produced, and particle shape, contrast layer colour, added luminescence colour and any other physical characteristic of the particles can be used as part of a complex unique identifier, by themselves or along with the alphanumeric identifier imaged on them.

Any number of such cut particles can be easily produced, bearing a batch-unique alphanumeric identifier. The size of each unique batch, i.e. the number of particles bearing the same alphanumeric identifier, can be scaled on the target surface and number of items, in order to achieve always an overwhelming number of particles per item that would result very difficult to take out.

The particles can be delivered as part of a paint or ink, pre-dispersed in a paint base or delivered dry and mixed with the paint at the delivery point, during delivery or even directly on the target item and surface, both by brushing and by spraying or with any other suitable method.

ILLUSTRATIVE EXAMPLE

Photographic Material Preparation

A 50% aqueous dispersion of titanium dioxide is produced by vigorous stirring. This dispersion has a pH of ~6.5-7.5, only slightly above the point of zero charge (pzc) for $TiO_2$ (occurring at pH=6, Svecova et al, Journal of Colloid and Interface Science, 325, 2, 2008, 363-370). Photographic film is typically produced using standard lime-processed ossein gelatin which has iso-electric point at pH 4.8-5, therefore in this envisaged system the gelatin will demonstrate negative charge indicating sorption occurs via the carboxylic acid groups of the protein. Sorption may also occur via calcium binding between the protein and oxide, The required length of photographic film is placed onto a commercial film developing reel, and the reel immersed in the $TiO_2$ dispersion for approximately 10 seconds with gentle agitation.

The reel is removed and rinsed several times by immersing in clean water. When wash water runs clear, the reel is removed and allowed to dry. Once dry the film may be removed from the developing reel and re-wound onto a conventional film reel allowing single particles to be cut.

Various alterations and modifications may be made to the present invention without departing from the scope of the invention.

The invention claimed is:

1. A method of producing batches of micro particles, comprising the steps of:

creating a photographic material having a plurality of batch unique codes imaged thereon;

forming a contrast layer of uniform colour onto the material by exposing the photographic material to an aqueous dispersion containing a contrast agent for a period of time to allow sorption of the contrast agent and then rinsing the photographic material to wash away any unsorbed excess contrast agent; and cutting the material to form a plurality of micro particles, each micro particle having a primary identifier in the form of said batch unique code.

2. The method of claim 1, wherein the contrast agent is a white pigment of small enough dimension to penetrate, even partially, the surface layer of the photographic material.

* * * * *